(12) United States Patent
Fan

(10) Patent No.: US 6,819,691 B2
(45) Date of Patent: Nov. 16, 2004

(54) CREATING SHARP ASYMMETRIC LINESHAPES IN MICROCAVITY STRUCTURES

(75) Inventor: Shanhui Fan, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 112 days.

(21) Appl. No.: 10/059,791

(22) Filed: Jan. 28, 2002

(65) Prior Publication Data

US 2003/0142719 A1 Jul. 31, 2003

(51) Int. Cl.[7] .............................................. H01S 3/10
(52) U.S. Cl. ........................... 372/20; 372/45; 372/50; 372/43
(58) Field of Search .............................. 372/20, 45, 50

(56) References Cited

U.S. PATENT DOCUMENTS

| | | | |
|---|---|---|---|
| 5,999,308 A | * 12/1999 | Nelson et al. ............... 359/321 |
| 6,058,127 A | 5/2000 | Joannopoulos | |
| 6,101,300 A | 8/2000 | Fan | |
| 6,130,969 A | * 10/2000 | Villeneuve et al. ........... 385/27 |
| 6,532,326 B1 | * 3/2003 | Hutchinson et al. .......... 385/37 |
| 2001/0048783 A1 | * 12/2001 | Herble et al. ................. 385/16 |
| 2003/0039446 A1 | * 2/2003 | Hutchinson et al. .......... 385/39 |

FOREIGN PATENT DOCUMENTS

EP      1 255 136 A2     6/2002

OTHER PUBLICATIONS

J.D. Joannopoulos et al., "Photonic crystals: putting a new twist on light," Nature, vol. 386, Mar. 13, 1997. pp. 143–149.

P.R. Villeneuve, et al., "Microcavities in photonic crystals: Mode symmetry, tunability, and coupling efficiency," The American Physical Society, vol. 54, No. 11, Sep. 15, 1996–I, pp. 7837–7842.

P.R. Villeneuve, et al., "Single–mode waveguide microcavity for fast optical switching," Optics Letters, vol. 21, No. 24, Dec. 15, 1996, pp. 2017–2019.

A. Mekis et al., "Absorbing Boundary Conditions for FDTD Simulations of Photonic Crystal Waveguides," IEEE Microwave and Guided Wave Letters, vol. 9, No. 12, Dec. 1999, pp. 502–504.

PCT Search Report, PCT/US 03/ 01581 dtd. Oct. 1, 2003.

* cited by examiner

Primary Examiner—Don Wong
Assistant Examiner—Dung Nguyen
(74) Attorney, Agent, or Firm—Parsons Hsue & de Runtz LLP

(57) ABSTRACT

We disclose a new structure that allows the creation of sharp and asymmetric lineshapes in optical microcavity systems. In this structure, the response function can vary from 0% to 100% in a frequency range that is narrower than the full width of the resonance itself. Therefore, an optical switch, based upon this structure, may require far less frequency shift to operate, compared with conventional microcavity-based structures. This method may also be used to improve the sensitivity of optical sensors based upon microcavity structures.

42 Claims, 6 Drawing Sheets

C = PHASE VEL. OF INCIDENT WAVE

CREATING SHARP ASYMMETRIC LINESHAPES IN MICROCAVITY STRUCTURES

BACKGROUND OF THE INVENTION

This invention relates in general to microcavity structures and in particular to microcavity structures with sharp asymmetric lineshapes.

Optical microcavity structures are of great current interests for device applications. These structures can exhibit high quality factors, and small modal volumes approaching $$\left(\frac{\lambda}{2n}\right)^3.$$

An intriguing potential application for such cavity structures is their use in optical modulation and switching. See for example P. R. Villeneuve, D. S. Abrams, S. Fan, and J. D. Joannopoulos, *Opt. Lett.* 21, 2017 (1996), and J. D. Joannopoulos, P. R. Villeneuve, D. S. Abrams and S. Fan, "Tunable microcavity and methods of using nonlinear materials in a photonic crystal," U.S. Pat. No. 6,058,127, issued May 2, 2000. The on/off switching functionality, for example, can be realized by shifting the center frequency of resonances either towards or away from the signal frequency. To achieve a large on/off contrast ratio, however, the required frequency shift tends to be much larger than the width of a single resonance to achieve switching or modulation of optical signals and other applications.

SUMMARY OF THE INVENTION

This invention is based on the observation that, by locating a resonator system adjacent to a waveguide and by employing at least two elements associated with the waveguide to cause partial reflection of electromagnetic radiation in the waveguide, a smaller frequency shift may cause a large change in the transmission and reflection of electromagnetic radiation in the waveguide.

The above-described phenomenon may be used in a number of applications, including switching or modulation of electromagnetic radiation transmission through a waveguide. Thus, switching or modulation may be accomplished by shifting the resonance frequency of the resonator system to thereby switch or modulate the transmission or reflection of electromagnetic radiation through the waveguide.

The above-described device may also be used for detecting substances. Thus, if the resonator system is placed in or in the vicinity of a certain substance, the substance may affect the resonance frequency of the resonator system. Therefore, by detecting electromagnetic radiation that is transmitted or reflected in the waveguide, an indication or measurement of the substance can be obtained.

BRIEF DESCRIPTION OF THE DRAWINGS

FIG. 1(*b*) is a schematic view of a waveguide side-coupled to a single-mode cavity, where two partially reflecting elements are placed in the waveguide to illustrate an embodiment of the invention.

In FIG. 5(*a*), the incident radiation has a frequency substantially at the resonance frequency of the point defect, and the frequency of the incident radiation illustrated in FIG. 5(*b*) is slightly shifted from the resonance frequency of the point defect in FIG. 3.

For simplicity in description, identical components are identified by the same numerals in this application.

DETAILED DESCRIPTION OF THE EMBODIMENTS

Figure 1A:
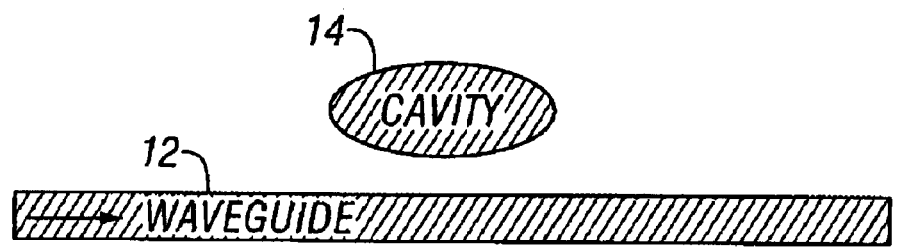
FIG. 1(*a*) is a waveguide side-coupled to a single mode cavity useful for illustrating the invention.

An optical system consisting of a waveguide 12 side-coupled to a single-mode cavity 14 is shown in FIG. 1(*a*). The basic geometry of this structure is analyzed in—H. A. Hau, and Y Lai, *J. Lightwave Technol.* 9, 754 (1991). FIG. 1(*b*) illustrates a structure geometry 10 where two partially reflecting elements 16 and 18 are placed in the waveguide 12. The arrow 20 indicates the direction of the input electromagnetic radiation to the waveguide.

As shown in FIG. 1(*b*), we introduce a novel geometry 10 that significantly reduces the frequency shift required for on/off switching in a microcavity structure. The geometry in FIG. 1(*a*) typically behaves as a narrow-band reflector with a symmetric Lorentzian reflectivity lineshape. For a more detailed description of characteristics of such geometry, please see H. A. Haus and Y. Lai, *J. Lightwave Technol.* 9, 754 (1991). Here, however, we intentionally incorporate two partially-reflecting elements 16 and 18 into the waveguide (FIG. 1(*b*)). We show that these elements can create sharp and asymmetric response lineshapes, which may allow the tuning of the system between zero and complete transmission, with a frequency shift that is significantly narrower than the full width of the resonance itself.

To start the discussion, let us first briefly review the properties of the basic geometry as shown in FIG. 1(*a*). At the resonance frequency of the cavity, the incident wave excites the resonant mode in the cavity 14. The power in the cavity then decays into both the forward and the backward directions of the waveguide 12. Along the forward direction, a destructive interference occurs between the incident wave and the decaying amplitude from the cavity, resulting in the complete reflection of the incident wave. Away from the resonance frequency, the power remains transmitted.

Quantitatively, the scattering property of this system for incident waves at a frequency ω can be described using a scattering matrix $S_c$:

$$\begin{bmatrix} b_1 \\ b_2 \end{bmatrix} \equiv S_c \begin{bmatrix} a_1 \\ a_2 \end{bmatrix} = \begin{bmatrix} \frac{-i\gamma}{(\omega-\omega_0)+i\gamma} & 1+\frac{-i\gamma}{(\omega-\omega_0)+i\gamma} \\ 1+\frac{-i\gamma}{(\omega-\omega_0)+i\gamma} & \frac{-i\gamma}{(\omega-\omega_0)+i\gamma} \end{bmatrix} \begin{bmatrix} a_1 \\ a_2 \end{bmatrix} \quad (1)$$

where $\omega_0$ and $\gamma$ are the center frequency and the width of the resonance, respectively. The scattering matrix maps the amplitudes $a_1$ and $a_2$ of the incident wave, to the amplitudes $b_1$ and $b_2$ of the outgoing wave. From Eq. (1), the reflection coefficient $R(\omega)$ at frequency ω is determined by:

$$R(\omega) = \frac{\gamma^2}{(\omega-\omega_0)^2 + \gamma^2} \quad (2)$$

The system behaves as a narrow band reflector with a symmetric Lorentzian reflection lineshape.

Equivalently, we could also describe the system in terms of a transfer matrix. A transfer matrix T relates the wave amplitudes $a_1$ and $b_1$ on one end of the structure, to the amplitudes on the other end $a_2$ and $b_2$. Thus the T-matrix can be determined from the corresponding scattering matrix S by:

$$\begin{bmatrix} b_2 \\ a_2 \end{bmatrix} \equiv T \begin{bmatrix} a_1 \\ b_1 \end{bmatrix} = \begin{bmatrix} s_{21} - \frac{S_{11}S_{22}}{S_{12}} & \frac{S_{22}}{S_{12}} \\ -\frac{S_{11}}{S_{12}} & \frac{1}{S_{12}} \end{bmatrix} \begin{bmatrix} a_1 \\ b_1 \end{bmatrix} \quad (3)$$

For the system as defined by the scattering matrix in Eq. (1), the corresponding transfer matrix $T_c$ is:

$$T_c = \begin{bmatrix} 1 - \frac{i\gamma}{\omega-\omega_0} & \frac{-i\gamma}{\omega-\omega_0} \\ \frac{i\gamma}{\omega-\omega_0} & 1+\frac{i\gamma}{\omega-\omega_0} \end{bmatrix} \quad (4)$$

Figure 1B:
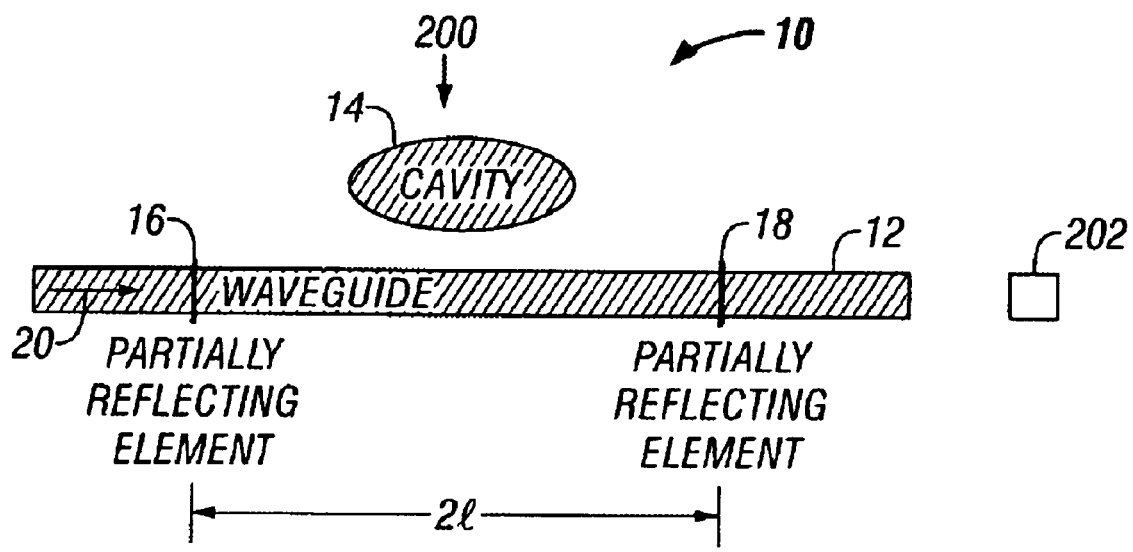

The presence of the partially reflecting elements 16 and 18, as shown in FIG. 1(b), profoundly changes the transmission and reflection characteristics of the system. Similar to the basic geometry as defined in FIG. 1(a), the transmitted amplitude here consists of two parts: the directly transmitted amplitudes, which represent the field components that propagate directly through the waveguide, and indirectly transmitted amplitudes which originate from the decaying amplitude of the cavity. Here, however, the presence of the partially reflecting elements significantly perturbs the phase of the directly transmitted amplitude, leading to complex interference phenomena.

Quantitatively, the response function of the entire system can be calculated by combining the transfer matrix of each individual element. For a partially reflecting element such as 16 or 18, the T-matrix $T_p$ can be determined by:

$$T_p = \frac{1}{i\sqrt{1-r^2}} \begin{bmatrix} -1 & -r \\ r & 1 \end{bmatrix} \quad (5)$$

where r is the amplitude reflectivity of the element. For a more detailed description of characteristics of partial reflecting elements, please see H. A. Haus, *Waves and Fields in Optoelectronics*, (New York Prentice-Hall, 1984). Therefore, the transfer matrix $T_s$ for the entire system is determined by:

$$T_s = -\frac{1}{1-r^2} \begin{bmatrix} -1 & -r \\ r & 1 \end{bmatrix} \begin{bmatrix} e^{i\delta} & 0 \\ 0 & e^{-i\delta} \end{bmatrix} \begin{bmatrix} 1-\frac{i\gamma}{\omega-\omega_0} & \frac{-i\gamma}{\omega-\omega_0} \\ \frac{i\gamma}{\omega-\omega_0} & 1+\frac{i\gamma}{\omega-\omega_0} \end{bmatrix} \begin{bmatrix} e^{i\delta} & 0 \\ 0 & e^{-i\delta} \end{bmatrix} \begin{bmatrix} -1 & -r \\ r & 1 \end{bmatrix} \quad (6)$$

where $\delta=(\omega/c)l$ is the phase shift that the incident wave acquires, as it propagates with a phase velocity c across the distance l between the partially reflecting element and the cavity.

From Eq. (6), the amplitude reflectivity $r_s$ is determined as:

$$r_s = \frac{T_{s,21}}{T_{s,22}} = \frac{-e^{4i\delta}r(\omega-\omega_0-i\gamma)-e^{2i\delta}(i\gamma)(1+r^2)+r(\omega-\omega_0+i\gamma)}{-e^{4i\delta}r^2(\omega-\omega_0-i\gamma)-2e^{2i\delta}(i\gamma)r+\omega-\omega_0+i\gamma} \quad (7)$$

In FIG. 1(b), the elements 16 and 18 cause Fabry-Perot oscillations in the waveguide 12. The solid lines in FIGS. 2(a) through 2(d) are theoretical transmission spectra through the optical system as shown in FIG. 1(b). The spectra are calculated from Eq. (7). We plot the frequencies in the unit of (c/l), where 21 is the distance between the two reflecting elements 16 and 18, and c the phase velocity of the electromagnetic radiation in the waveguide. In FIGS. 2(a) through 2(d), each of the reflecting elements has a reflection coefficient r=0.4. The width of the resonance is 0.002(c/l). The resonance frequencies of the cavity are taken to be 0.175(c/l), 0.25(c/l), 0.325(c/l) and 0.375(c/l) in FIGS. 2(a) through 2(d) respectively. The dashed lines represent the transmission spectrum through the two reflecting elements, without the presence of the cavity.

To explore the physical phenomena encapsulated in Eq. (7), we plot as solid lines in FIGS. 2(a) through 2(d) the transmission spectra that are determined from Eq. (7) as $1-|r_s|^2$. Here, we assume r=0.2 and $\gamma=0.002(c/l)$, and we vary the resonance frequency $\omega_0$ from 0.175 c/l to 0.375 c/l. As a comparison, we also plot in FIGS. 2(a) through 2(d) as dashed lines the transmission spectra for the same system without the cavity. The dashed line shows the typical Fabry-Perot oscillations with a maximum occurring at 0.25·(c/l).

Examining FIGS. 2(a) through 2(d), we note that the spectra consists of resonant features (caused by the cavity 14) superimposed upon a background defined by the Fabry-Perot oscillations (caused by the elements 16 and 18). Also, the shapes of the resonant features depend critically on the relative positions of the resonance frequency in relation to the background. In particular, when the resonance frequency coincides with a maximum of the Fabry-Perot oscillations, the transmission exhibits a symmetric Lorentzian-like lineshape, as can been seen in the case of FIG. 2(b) where $\omega_0=0.25(c/l)$. The structure behaves as a narrow-band reflector.

Figure 2A:
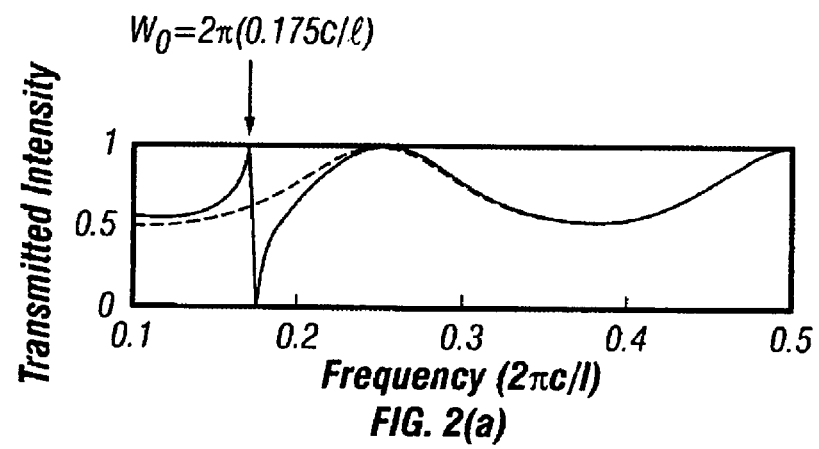
FIGS. 2(*a*)–2(*d*) are graphical illustrations of transmission spectra through the optical system of FIG. 1(*b*) to illustrate the operation of the embodiment in FIG. 1(*b*) where the transmission spectra in FIGS. 2(*a*)–2(*d*) correspond to different values of the resonance frequencies of the cavity.
Figure 2B:
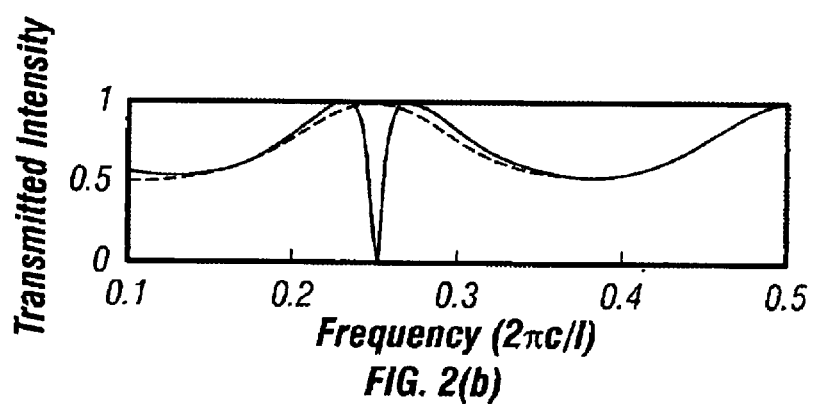
Figure 2C:
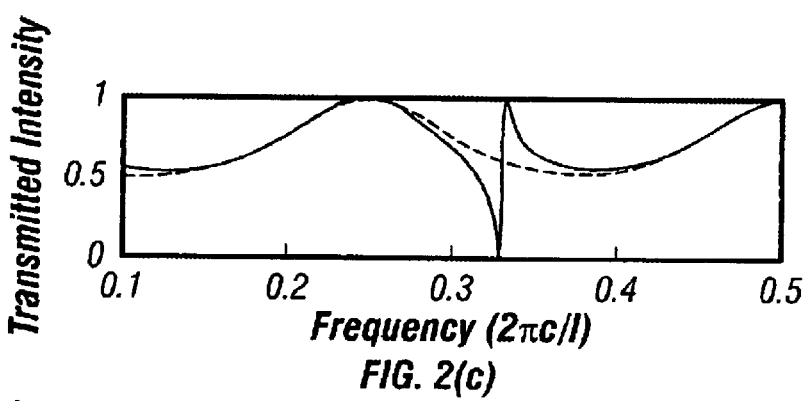
Figure 2D:
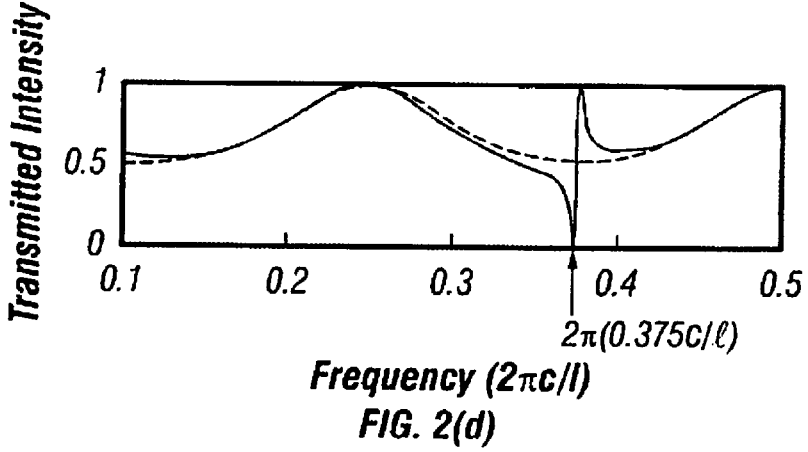

For most choices of resonance frequencies, on the other hand, the spectra display a distinct asymmetric lineshape. In other words, when the resonance frequency of the cavity does not substantially coincide with a maximum of the Fabry-Perot oscillations, the spectra display a distinct asymmetric lineshape, as illustrated in FIGS. 2(a), 2(c) and 2(d). In the vicinity of the resonance frequency $\omega_0$, the transmission coefficient varies sharply from 0% to 100% within a narrow range of frequency. From Eq. (7), one can determine that the transmission vanishes at a frequency $\omega_r=\omega_0$, while the transmission reaches 100% at a frequency $\omega_t$, defined by the equation:

$$\frac{\omega_t - \omega_0}{\gamma} = \frac{1 + r^2 - 2r\cos(2\delta)}{2r\sin(2\delta)} \quad (8)$$

In general, since the phase shift $\delta$ is a function of frequency, $\omega_t$ can only be determined by solving Eq. (8) self-consistently. In the limit where the width of the resonance is narrow, however, the parameter $\delta$ varies slowly as a function of frequencies. We can therefore determine $\omega_t$ directly using Eq. (8) by approximating $\delta(\omega)$ with $\delta(\omega=\omega_0)$.

The difference between $\omega_t$ and $\omega_0$, as calculated from Eq. (8), determines the frequency shift needed to switch the system from complete reflection to complete transmission. As a numerical example, assuming r=0.5 and $2\delta=(2n-\frac{1}{2})\pi$, the shift can be as small as $\gamma$, 1.25$\gamma$ or a value in between. In comparison, in order to achieve an on/off contrast ratio of 30 dB in a single-mode microcavity structure without the reflective elements 16 and 18, the required shift in the resonance frequency exceeds 31$\gamma$. Moreover, as can be noted from FIG. 2, the asymmetric lineshapes can be found in systems with wide ranges of parameters. The occurrence of this phenomena should therefore be rather robust against fabrication inaccuracies. We also note that it is not necessary that the cavity be located at the mid-point between the two partially reflecting elements in order for the observation of the asymmetric lineshape.

Figure 3:
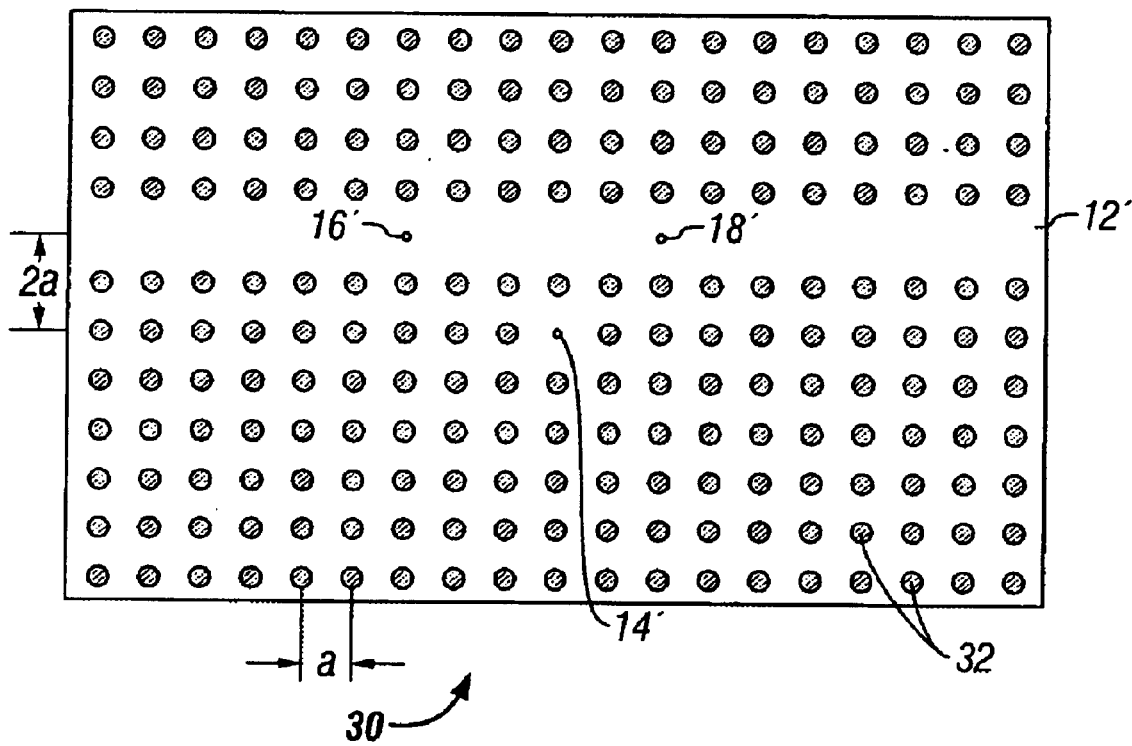
FIG. 3 is a schematic view of a photonic crystal structure with a line defect side-coupled to a point defect, where the line defect is formed by removing a single row of rods from the crystal, and two smaller rods are placed in the line defect to cause partial reflections.

To realize the results of the analytic theory, we consider the propagation of electromagnetic wave in a photonic crystal structure 30 as shown in FIG. 3. The crystal is made up of a square lattice of high-index dielectric rods 32 with a radius of 0.20a, where a is the lattice constant. In the crystal, a waveguide 12' is formed by removing a row of dielectric rods to form a line defect, and a cavity is created by reducing the radius of a single cylinder 14' to 0.10a, which is a point defect. The cavity is placed at a distance 2a away from the center of the waveguide. Such a cavity supports a localized monopole state (or at least one resonant state with at least one resonance frequency) which is singly degenerate. For a more detailed description of characteristics of line and point defects in photonic crystals, please see J. D. Joannopoulos, R. D. Meade, and J. N. Winn, *Photonic Crystals,* (Princeton University Press, Princeton, 1995), and P. R. Villeneuve, S. Fan, and J. D. Joannopoulos, *Phys. Rev. B,* 54, 7837 (1996). Within the waveguide 12', we introduce two small cylinders 16' and 18', each with a radius 0.05a. These cylinders provide the partial reflection for modes that are propagating within the waveguide. All the cylinders in the crystal, including those smaller ones, have a dielectric constant of 11.56.

FIG. 3 illustrates a photonic crystal structure 30 with a line defect 12' side-coupled to a point defect 14'. The crystal consists of a square lattice of rods 32 with a dielectric constant of 11.56 and a radius of 0.2a. A line defect 12' is formed by removing a single row of rods from the crystal. Within the line defect, two smaller rods 16' and 18' with a radius of 0.05a are placed to introduce partial reflection. A point defect 14', created by reducing the radius of a single rod to 0.10a. is placed 2a away from the center of the line defect.

We simulate the response of the structure 30 shown in FIG. 3 using a finite-difference time-domain scheme in combination with the perfectly matched layer (PML) boundary conditions. For a more detailed description of such scheme and boundary conditions, please see A. Taflove and S. C. Hagness, "Computational Electrodynamics: the finite-different time-domain method," (Artech House, Boston, 2000), and J. P. Berenger, *J. Comput. Phys.* 114, 185 (1994). At the entrances to the photonic crystal waveguides, structures consisting of a defect in a distributed Bragg mirror are placed to reduce the reflection; please see A. Mekis, S. Fan, and J. D. Joannopoulos, *IEEE Microwave and Guided Wave Lett.,* 9, 502 (1999) for details. A pulse is created by exciting a monopole source at one end of the waveguide. The transmission coefficients are then calculated by Fourier transforming the amplitude of the fields at the other end of the waveguide. The simulated transmission spectrum is shown as a solid line in FIG. 4. In comparison, we also show as dashed lines in FIG. 4 the transmission spectra for the same structure, except without the two small cylinders 16' and 18' in the waveguide or line defect 12'.

Figure 4:
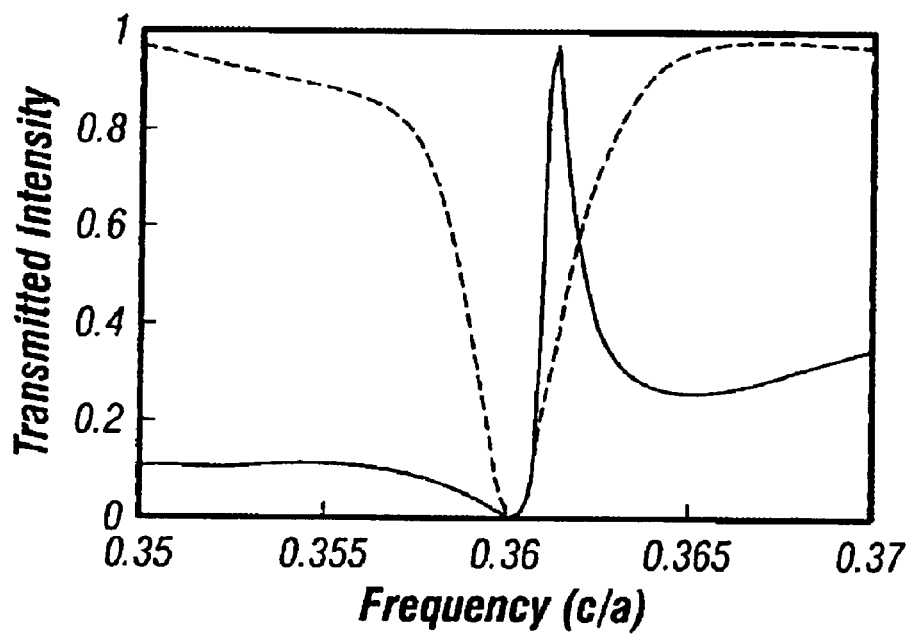
FIG. 4 is a graphical illustration of the transmission spectra through the structure of FIG. 3, where the dashed line illustrates the transmission spectra of such structure but without the two smaller rods in the line defect.

Without the presence of the two smaller cylinders in the waveguide, the transmission spectrum approximates a Lorentzian lineshape. The central frequency of the Lorentzian defines the resonance frequency $\omega_0=0.3603\cdot(2\pi c/a)$ of the cavity, and the full-width at half minimum $2\gamma=0.0024\cdot(2\pi c/a)$. At the resonance frequency, the transmission coefficient drops to 0%, as expected from Eq. (2), and the structure behaves as a narrow band reflector (FIG. 4, dashed lines). In contrast, the introduction of the two smaller cylinders, generates a sharp and asymmetric lineshape (FIG. 4, solid lines). We note the structure remains completely reflecting at $\omega_0$. As the frequency increases from $\omega_0$, however, the transmission coefficient increases rapidly and reaches a maximum that exceeds 99% at a frequency $\omega_t=0.3613\cdot(2\pi c/a)$. The difference of $0.0013\cdot(2\pi c/a)$ between $\omega_t$ and $\omega_0$, which represents the frequency shift that is required in order to switch the system from a complete transmission to a complete reflection state, is far smaller than the full width at half minimum of $0.0024\cdot(2\pi c/a)$ of the Lorentzian resonance. All these features agree with the analysis presented above.

Figure 5A:
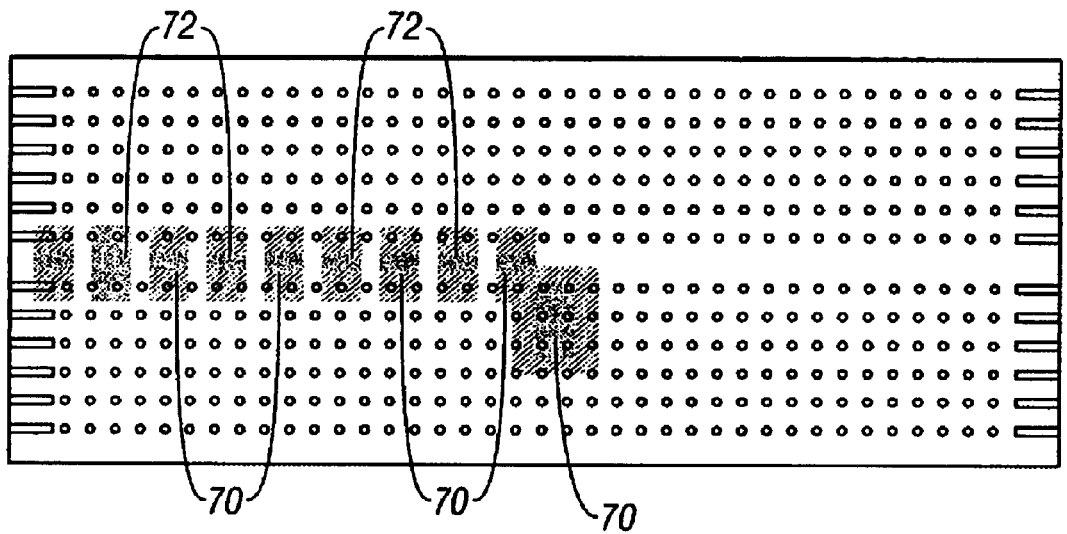
FIGS. 5(*a*) and 5(*b*) are graphical illustrations of the steady-state electric field distributions in the structure of FIG. 3 for incident electromagnetic radiation to the structure at two different frequencies to illustrate the invention.
Figure 5B:
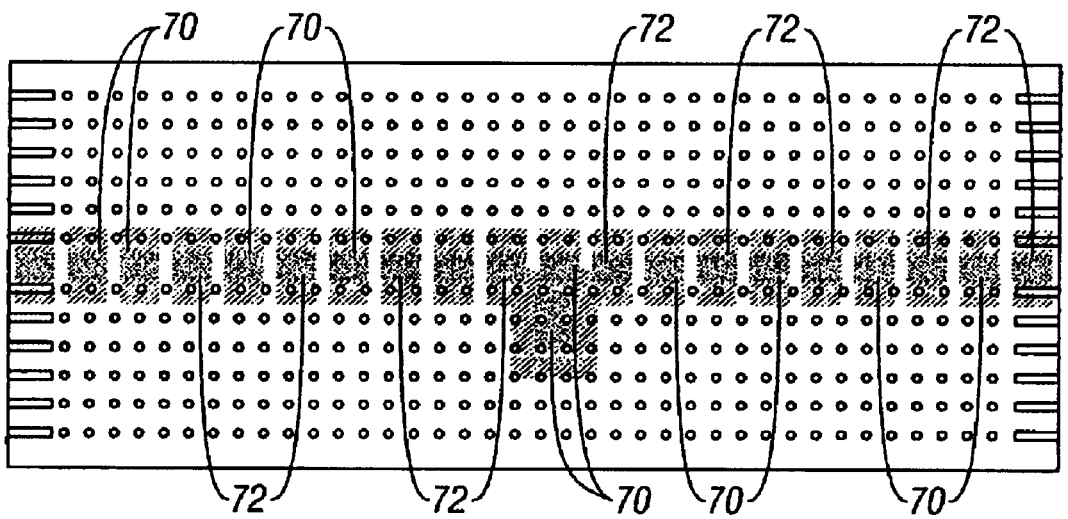
Figure 6A:
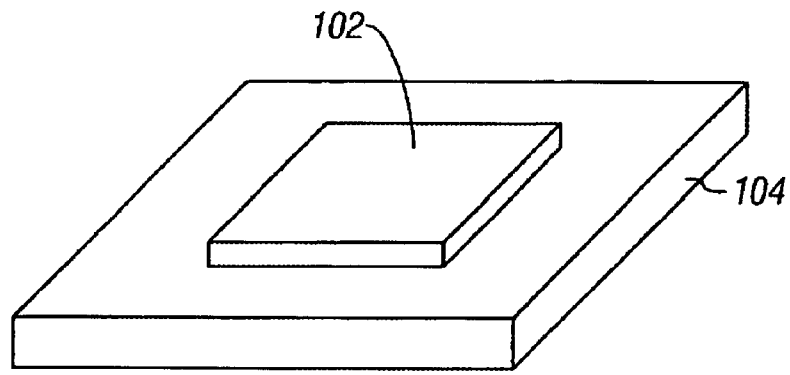
FIGS. 6(*a*)–6(*d*) are perspective schematic views of resonators to illustrate alternative implementations of the resonator system of FIG. 1(*b*).
Figure 6B:
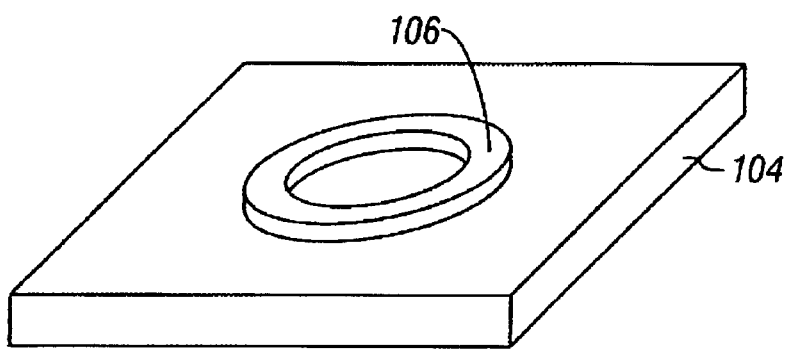
Figure 6C:
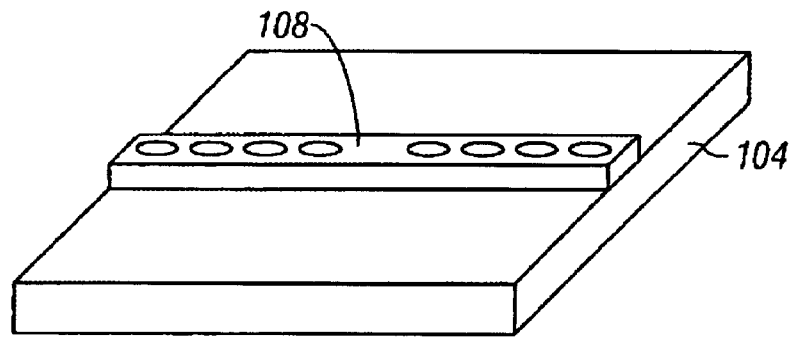
Figure 6D:
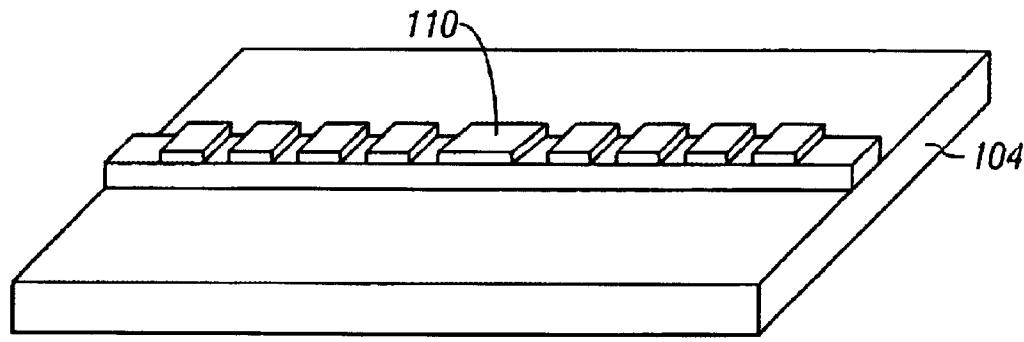

FIGS. 5(a) and 5(b) illustrate steady-state electric field distributions in the structure 30 as shown in FIG. 3, for the incident frequencies at $\omega=0.3603(2\pi c/a)$ and $\omega=0.3614(2\pi c/a)$ respectively. The areas 70 and 72 represent large positive and negative fields, respectively.

The steady state field distributions at the two frequencies $\omega_t$ and $\omega_0$ are shown in FIG. 5. At $\omega=\omega_0$, the field is completely reflected (FIG. 5(a)), while at $\omega=\omega_t$, the field remains transmitted in the waveguide (FIG. 5(b)). An important feature here is the existence of significant optical power within the cavity for both of these two states. This is a further evidence that both frequencies fall within the lineshape of the resonance.

It should be emphasized that the effect here is robust. No detailed tuning of either the resonance frequency of the cavity or the coupling between the cavity and the waveguide is required to achieve this sharp and asymmetric lineshape. Also, since the reflectivities of the partially reflecting elements need not be large, the underlying physics here resembles the Fano resonances, involving the interference between a continuum and a discreet level in an atomic system which is explained in more detail in U. Fano, *Phys. Rev.,* 124, 1866 (1961). Finally, for structures with inherent radiation losses from the cavity, such as photonic crystal slabs, the criteria for observing this effect is that the decay of the cavity mode into the waveguide should dominate over the inherent loss of the cavity. With the suggestion of the existence of structures where the radiation Q exceeds 15,000 (see O. Painter, T. Vuckovic and A. Scherer, *J. Opt. Soc. Am. B* 16, 275 (1999), the effect reported here may allow the construction of devices that are sensitive to a fractional change of the index as small as $10^{-4}$.

While in the discussion above we use a line defect photonic crystal waveguide and a point defect cavity photonic crystal resonator in waveguide-cavity interactions, it will be appreciated that other types of waveguides and cavity geometries can be used as well. This is illustrated below.

Instead of using the point defect photonic crystal cavity geometries, FIGS. 6(*a*) through 6(*d*) show a few of the possibilities for the cavity geometry. The cavity can consist of a high index dielectric (e.g. a semiconductor or electrooptic material) block 102 placed on top of a low index dielectric (e.g. another semiconductor material) material 104. (FIG. 6(*a*)). An optical cavity can also be formed by creating a ring-shaped waveguide 106 placed on top of a low index dielectric material 104 (FIG. 6(*b*)). In addition, one could construct a cavity by introducing a periodic index contrast into a waveguide 108 comprising a high index dielectric block placed on top of a low index dielectric material 104, and by perturbing the periodicity of waveguides 108 and 110 each comprising a high index dielectric block placed on top of a low index dielectric material 104. (FIGS. 6 (*c*) and (*d*)). Thus, FIG. 6(*c*) illustrates a waveguide microcavity geometry. The cavity is formed in a waveguide by etching a periodic array of holes into the waveguide, and by increasing the distance between the two holes at the center of the array. FIG. 6(*d*) illustrates a distributed feedback cavity structure. The cavity is formed by introducing grating along the waveguide, and by creating a phase shift within the grating.

Figure 7A:
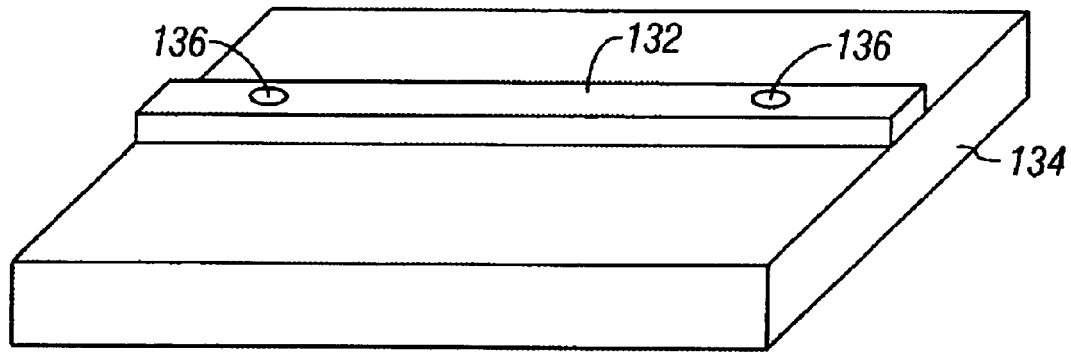
FIGS. 7(*a*)–7(*c*) are perspective schematic views of high refractive dielectric waveguides placed on top of a low refractive index dielectric substrates to illustrate other implementations of the waveguide structure of FIG. 1(*b*).
Figure 7B:
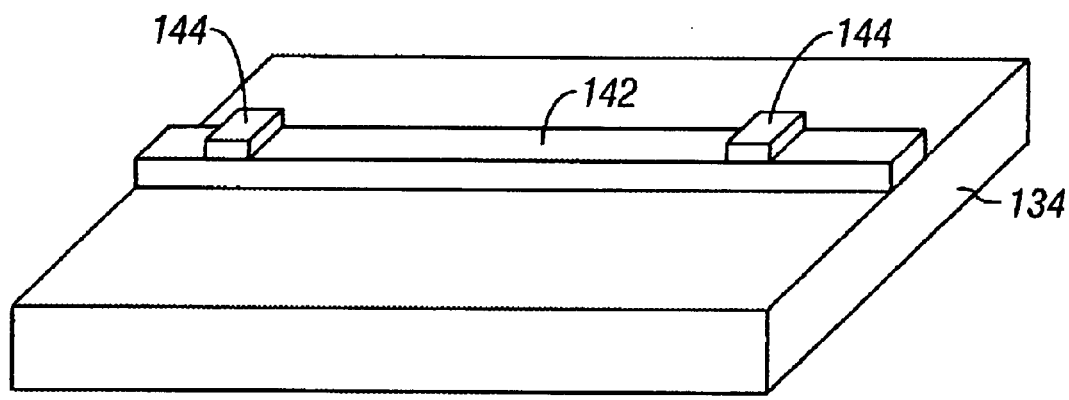
Figure 7C:
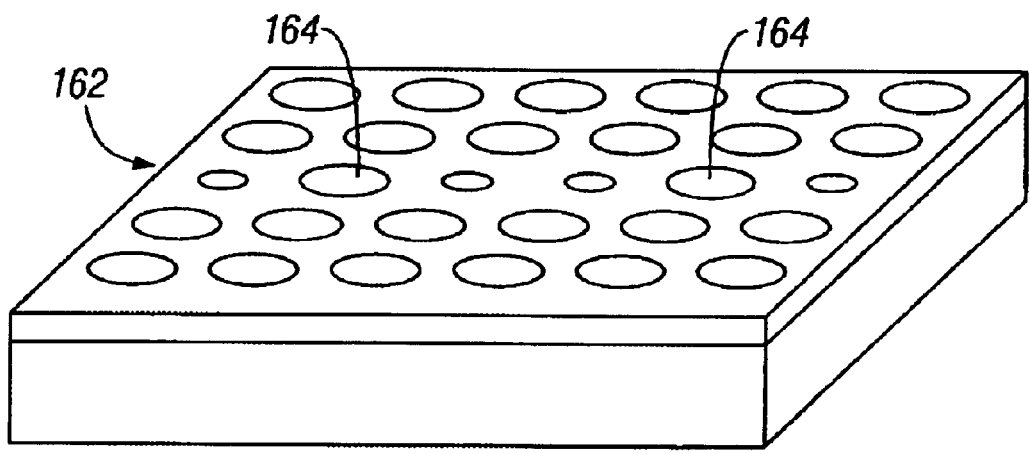

Instead of using a photonic crystal waveguide 12' shown in FIG. 3, one could also use a high index dielectric (e.g. a semiconductor or electrooptic material) waveguide as illustrated in FIGS. 7(*a*) and 7(*b*). FIG. 7(*a*) illustrates a high-index dielectric waveguide 132, placed on top of a low index substrate (e.g. another semiconductor or electrooptic material) 134. The partially reflecting elements are introduced by etching two air holes 136 into the waveguide. If the index of the material in waveguide 132 is greater than those of the material in substrate 134 and of the medium (e.g. air) surrounding the waveguide, then radiation in the material 132 would tend to be confined therein to serve the function of a waveguide.

FIG. 7(*b*) illustrates a high-index dielectric waveguide 142, placed on top of a low index substrate 134. The partially reflecting elements are introduced by placing two budges 144 on the waveguide 142. If the index of the material in waveguide 142 is greater than those of the material in substrate 134 and of the medium (e.g. air) surrounding the waveguide, then radiation in the material 142 would tend to be confined therein to serve the function of a waveguide.

Furthermore, instead of using a periodic array of dielectric posts, one could also construct a photonic crystal by etching a periodic array of air holes into a high index dielectric slab. FIG. 7(*c*) illustrates a photonic crystal waveguide that is different from that of FIG. 3. The crystal 160 is constructed by etching a periodic array of air holes into a high index dielectric slab. Altering the radius of a single row 162 of holes forms a waveguide. Within the waveguide, two partially reflecting elements are introduced by changing the radius of two holes 164 within the waveguide. The photonic crystals of FIGS. 3 and 7(*c*) may be one-dimensional, two-dimensional or three-dimensional photonic crystals.

Any one of the cavities in FIGS. 6(*a*) through 6(*d*) may be placed in the vicinity of any one of the waveguides in FIGS. 7(*a*) through 7(*c*) to accomplish the general configuration of the embodiment shown in FIG. 1(*b*). Obviously many other configurations of the cavity 14 and waveguide 12 may be employed and are within the scope of the invention.

Our device can be configured either as a switch, or as a sensor, that will respond to the index variation in the vicinity of the cavity region. Thus the resonance frequency of the cavity may be altered or shifted by such index variation. Such index variation can be introduced through a stimulus such as electrical, thermal, chemical or mechanical means, as indicated by arrow 200 shown in FIG. 1(*b*). Thus, a current or an electric field may be introduced to the cavity by means such as electrodes and probes (not shown). A magnetic field may be introduced to the cavity by means such as a wire carrying current or a permanent magnet (not shown). The cavity may also be heated by a heating element (not shown). Or electromagnetic or other forms of radiation may be supplied to the cavity. Any one of such means can cause a shift in the resonance frequency of the cavity, and causes the electromagnetic radiation transmission characteristics of the waveguide to change abruptly as described above.

Thus, if the resonance frequency of the cavity is set by any one of the above-described means to cause the waveguide to be transmissive of electromagnetic radiation of a wavelength, the application of another stimulus (again can be any one of the above-described means) may cause the waveguide to be substantially completely reflective at such wavelength. Alternatively, if the resonance frequency of the cavity is set by any one of the above-described means to cause the waveguide to be reflective of electromagnetic radiation of a wavelength, the application of another stimulus (again can be any one of the above-described means) may cause the waveguide to be substantially entirely transmissive at such wavelength. In yet another alternative implementation, if the resonance frequency of the cavity is set by any one of the above-described means to cause the waveguide to be partly reflective and partly transmissive of electromagnetic radiation of a wavelength, the application of another stimulus (again can be any one of the above-described means) may cause the waveguide to be substantially entirely transmissive or reflective at such wavelength. The resonance frequency of the cavity may be set or shifted to one in the microwave or optical range.

If a substance is placed into or in the vicinity of the cavity, the resonance frequency of the cavity may be shifted thereby. Thus, by detecting the frequency shift of the cavity by means of a detector 202 in FIG. 1(*b*), it is possible to detect the substance. The frequency shift can be detected by detecting the transmission or reflection characteristics of the waveguide 12. The substance may be introduced into the cavity 14, for example, by placing the cavity, or the cavity and the waveguide, in the substance such as a gas or a liquid (not shown). Or a solid substance (not shown) may be introduced into the cavity 14 by means of an instrument (not shown).

While the invention has been described above by reference to various embodiments, it will be understood that changes and modifications may be made without departing from the scope of the invention, which is to be defined only by the appended claims and their equivalent. All references referred to herein are incorporated by reference in their entireties.

What is claimed is:

1. A device for transmitting electromagnetic radiation, comprising:
   a waveguide transmitting electromagnetic radiation;
   a resonator system adjacent to the waveguide, said resonator system affecting the transmission of electromagnetic radiation in the waveguide; and
   at least two elements associated with the waveguide, said elements causing partial reflection of electromagnetic radiation in the waveguide.

2. The device of claim 1, wherein said resonator system supports at least one resonant state with at least one resonance frequency.

3. The device of claim 1, wherein said waveguide and said resonator system are in a photonic crystal.

4. The device of claim 3, wherein said resonator system comprises at least one point defect in said photonic crystal.

5. The device of claim 3, wherein said waveguide comprises a line defect in said photonic crystal.

6. The device of claim 1, wherein said waveguide comprises a high index dielectric waveguide surrounded by at least one low-index medium.

7. The device of claim 1, wherein said resonator system comprises at least one high index dielectric region surrounded by at least one low-index medium.

8. The device of claim 1, wherein said resonator system comprises at least one point defect in a one-dimensional, two-dimensional or three-dimensional photonic crystal.

9. The device of claim 1, wherein said at least two elements are located in or adjacent to the waveguide.

10. The device of claim 1, wherein said at least two elements associated with the waveguide generate Fabry-Perot oscillations in the transmission of electromagnetic radiation through the waveguide.

11. The device of claim 10, wherein said resonator system supports at least one resonant state with at least one resonance frequency and is configured such that said resonance frequency does not substantially coincide with a maximum of said Fabry-Perot oscillations.

12. An apparatus for switching or modulating electromagnetic radiation, comprising:
   (a) a device comprising:
   a waveguide transmitting electromagnetic radiation from a source;
   a resonator system adjacent to the waveguide, said resonator system defining at least one resonance frequency, and affecting the transmission of electromagnetic radiation in the waveguide; and
   at least two elements associated with the waveguide, said elements causing partial reflection of electromagnetic radiation in the waveguide; and
   (b) a mechanism to shift said resonance frequency of said resonator system, and thereby to switch or modulate the transmission of electromagnetic radiation through the waveguide.

13. The apparatus of claim 12, wherein said mechanism comprises shifting said resonance frequency by applying electric field, magnetic field, electric current, or electromagnetic radiation energy.

14. The apparatus of claim 13, wherein said resonator system comprises a nonlinear material.

15. The apparatus of claim 13, wherein said resonator system comprises an electrooptic or semiconductor material.

16. The apparatus of claim 12, wherein said mechanism comprises shifting said resonance frequency by applying heat.

17. The apparatus of claim 12, wherein said resonator system is configured such that said waveguide partially transmits and partially reflects electromagnetic radiation at a predetermined wavelength, wherein the waveguide becomes substantially completely transmissive or completely reflective to radiation at the predetermined wavelength when said mechanism is applied.

18. The apparatus of claim 12, wherein said resonator system is configured such that the waveguide substantially reflects all electromagnetic radiation at a predetermined wavelength, wherein the waveguide becomes substantially completely transmissive to radiation at the predetermined wavelength when said mechanism is applied.

19. The apparatus of claim 12, wherein said resonator system is configured such that the waveguide substantially transmits all electromagnetic radiation at a predetermined wavelength, wherein the waveguide becomes substantially completely reflective to radiation at the predetermined wavelength when said mechanism is applied.

20. The apparatus of claim 12, wherein said resonance frequency is in a microwave or optical wavelength range.

21. The apparatus of claim 12, wherein said resonator system supports at least one resonant state with at least one resonance frequency.

22. The apparatus of claim 12, wherein said waveguide and said resonator system are in a photonic crystal.

23. The apparatus of claim 22, wherein said resonator system comprises at least one point defect in said photonic crystal.

24. The apparatus of claim 22, wherein said waveguide comprises a line defect in said photonic crystal.

25. The apparatus of claim 12, wherein said waveguide comprises a high index dielectric waveguide surrounded by at least one low-index medium.

26. The apparatus of claim 12, wherein said resonator system comprises at least one high index dielectric region surrounded by at least one low-index medium.

27. The apparatus of claim 12, wherein said resonator system comprises at least one point defect in a one-dimensional, two-dimensional or three-dimensional photonic crystal.

28. The apparatus of claim 12, wherein said at least two elements are located in or adjacent to the waveguide.

29. The apparatus of claim 12, wherein said at least two elements associated with the waveguide generate Fabry-Perot oscillations in the transmission of electromagnetic radiation through the waveguide.

30. The apparatus of claim 29, wherein said resonator system supports at least one resonant state with at least one resonance frequency and is configured such that said resonance frequency does not substantially coincide with a maximum of said Fabry-Perot oscillations.

31. An apparatus for detecting a substance, comprising:
   (a) a device comprising:
   a waveguide transmitting electromagnetic radiation from a source;
   a resonator system adjacent to the waveguide, said resonator system defining at least one resonance frequency, and affecting the transmission of electromagnetic radiation in the waveguide; and
   at least two elements associated with the waveguide, said elements causing partial reflection of electromagnetic radiation in the waveguide; and
   (b) an instrument detecting transmission or reflection of electromagnetic radiation through the waveguide.

32. The apparatus of claim 31, wherein said substance shifts said resonance frequency, resulting in significant variation of transmission or reflection in said waveguide.

33. The apparatus of claim 31, wherein said resonator system supports at least one resonant state with at least one resonance frequency.

34. The apparatus of claim 31, wherein said waveguide and said resonator system are in a photonic crystal.

35. The apparatus of claim 34, wherein said resonator system comprises at least one point defect in said photonic crystal.

36. The apparatus of claim 34, wherein said waveguide comprises a line defect in said photonic crystal.

37. The apparatus of claim 31, wherein said waveguide comprises a high index dielectric waveguide surrounded by at least one low-index medium.

38. The apparatus of claim 31, wherein said resonator system comprises at least one high index dielectric region surrounded by at least one low-index medium.

39. The apparatus of claim 31, wherein said resonator system comprises at least one point defect in a one-dimensional, two-dimensional or three-dimensional photonic crystal.

40. The apparatus of claim 31, wherein said at least two elements are located in or adjacent to the waveguide.

41. The apparatus of claim 31, wherein said at least two elements associated with the waveguide generate Fabry-Perot oscillations in the transmission of electromagnetic radiation through the waveguide.

42. The apparatus of claim 41, wherein said resonator system supports at least one resonant state with at least one resonance frequency and is configured such that said resonance frequency does not substantially coincide with a maximum of said Fabry-Perot oscillations.

* * * * *